US010592749B2

(12) United States Patent
Coppock et al.

(10) Patent No.: US 10,592,749 B2
(45) Date of Patent: Mar. 17, 2020

(54) SYSTEMS AND METHODS FOR ANALYZING TURNS AT AN AIRPORT

(71) Applicant: General Electric Company, Schenectady, NY (US)

(72) Inventors: John C. Coppock, Austin, TX (US); Andrew Glen Rector, Austin, TX (US)

(73) Assignee: General Electric Company, Schenectady, NY (US)

( * ) Notice: Subject to any disclaimer, the term of this patent is extended or adjusted under 35 U.S.C. 154(b) by 142 days.

(21) Appl. No.: 15/696,318

(22) Filed: Sep. 6, 2017

(65) Prior Publication Data

US 2018/0137361 A1 May 17, 2018

Related U.S. Application Data

(60) Provisional application No. 62/421,619, filed on Nov. 14, 2016.

(51) Int. Cl.
*G06K 9/00* (2006.01)
*G06T 7/246* (2017.01)
(Continued)

(52) U.S. Cl.
CPC ..... *G06K 9/00718* (2013.01); *G06K 9/00744* (2013.01); *G06K 9/00785* (2013.01); (Continued)

(58) Field of Classification Search
CPC ..... G06K 2009/00738; G06K 9/00718; G06K 9/00744; G06K 9/00785; (Continued)

(56) References Cited

U.S. PATENT DOCUMENTS 4,943,919 A  7/1990 Aslin et al.
5,729,765 A  3/1998 Cheng
(Continued)

FOREIGN PATENT DOCUMENTS

CN  103679341 A  3/2014
CN  103970102 A  8/2014
(Continued)

OTHER PUBLICATIONS

U.S. Appl. No. 15/653,294, filed Jul. 18, 2017.
(Continued)

*Primary Examiner* — Tom Y Lu
(74) *Attorney, Agent, or Firm* — Dority & Manning, P.A.

(57) ABSTRACT

One example aspect of the present disclosure is directed to a method for analyzing at least one phase of an aircraft turn at an airport. The method includes receiving one or more video streams. The method includes processing the one or more video streams to identify one or more objects. Processing the one or more video streams includes extracting data associated with the one or more objects. The method includes tracking the one or more objects to determine an event based on the one or more objects and the data. The method includes storing the event in a database with an associated parameter. The method includes performing an analysis of the at least one phase of the aircraft turn based, at least in part, on the event and the associated parameter. The method includes providing a signal indicative of an issue with the event based on the analysis.

20 Claims, 8 Drawing Sheets

(51) Int. Cl.
*G08G 5/00* (2006.01)
*G08G 5/02* (2006.01)
*G08G 5/06* (2006.01)

(52) U.S. Cl.
CPC ........... *G06T 7/246* (2017.01); *G08G 5/0013* (2013.01); *G08G 5/0026* (2013.01); *G08G 5/0065* (2013.01); *G08G 5/0082* (2013.01); *G08G 5/025* (2013.01); *G08G 5/065* (2013.01); *G06K 2009/00738* (2013.01); *G06T 2207/10016* (2013.01); *G06T 2207/10024* (2013.01); *G06T 2207/30236* (2013.01); *G06T 2207/30248* (2013.01)

(58) Field of Classification Search
CPC . G06T 2207/10016; G06T 2207/30248; G06T 7/246; G06T 2207/10024; G06T 2207/30236; G08G 5/0082; G08G 5/0013; G08G 5/0026; G08G 5/0065; G08G 5/025; G08G 5/065
See application file for complete search history.

(56) References Cited

U.S. PATENT DOCUMENTS

| | | | |
|---|---|---|---|
| 5,913,912 A | 6/1999 | Nishimura et al. | |
| 6,216,066 B1 | 4/2001 | Goebel et al. | |
| 6,262,659 B1 | 7/2001 | Korkosz et al. | |
| 6,275,767 B1 | 8/2001 | Delseny et al. | |
| 6,278,965 B1 | 8/2001 | Glass et al. | |
| 6,292,723 B1 | 9/2001 | Brogan et al. | |
| 6,529,820 B2 | 3/2003 | Tomescu | |
| 6,539,783 B1 | 4/2003 | Adibhatla | |
| 6,628,995 B1 | 9/2003 | Korson et al. | |
| 6,721,714 B1 | 4/2004 | Baiada et al. | |
| 6,775,647 B1 | 8/2004 | Evans et al. | |
| 6,799,154 B1 | 9/2004 | Aragones et al. | |
| 6,892,127 B2 | 5/2005 | Wiseman | |
| 6,901,377 B1 | 5/2005 | Rosenfeld et al. | |
| 6,961,732 B2 | 11/2005 | Hellemann et al. | |
| 7,020,595 B1 | 3/2006 | Adibhatla et al. | |
| 7,096,210 B1 | 8/2006 | Kramer et al. | |
| 7,181,478 B1 | 2/2007 | Korson et al. | |
| 7,197,503 B2 | 3/2007 | Palanisamy et al. | |
| 7,328,128 B2 | 2/2008 | Bonanni et al. | |
| 7,333,887 B2 | 2/2008 | Baiada et al. | |
| 7,379,799 B2 | 5/2008 | Cleary et al. | |
| 7,461,019 B2 | 12/2008 | Wang | |
| 7,509,537 B1 | 3/2009 | Jensen et al. | |
| 7,548,802 B2 | 6/2009 | Avery et al. | |
| 7,742,938 B2 | 6/2010 | Blanchard et al. | |
| 7,809,527 B2 | 10/2010 | Bailly et al. | |
| 7,813,871 B2 | 10/2010 | Small et al. | |
| 7,826,943 B2 | 11/2010 | Yu et al. | |
| 7,921,350 B2 | 4/2011 | Eklund | |
| 7,979,192 B2 | 7/2011 | Morrison et al. | |
| 7,983,809 B2 | 7/2011 | Kell et al. | |
| 8,103,462 B2 | 1/2012 | Liu et al. | |
| 8,121,778 B2 | 2/2012 | Brozat | |
| 8,364,340 B2 | 1/2013 | Nestico et al. | |
| 8,401,760 B2 | 3/2013 | Payne et al. | |
| 8,483,902 B2 | 7/2013 | Cornet et al. | |
| 8,489,604 B1 | 7/2013 | Sadovsky et al. | |
| 8,527,327 B1 | 9/2013 | Lawrence | |
| 8,560,376 B2 | 10/2013 | Lienhardt | |
| 8,566,016 B2 | 10/2013 | Law et al. | |
| 8,645,148 B2 | 2/2014 | Small et al. | |
| 8,676,436 B2 | 3/2014 | Raimarckers et al. | |
| 8,694,196 B1 | 4/2014 | Doulatshahi et al. | |
| 8,694,238 B2 | 4/2014 | Venkatasubramanian | |
| 9,208,209 B1 | 12/2015 | Katz | |
| 9,321,542 B2 | 4/2016 | Dunsdon | |
| 9,424,521 B2 | 8/2016 | Bloomquist et al. | |
| 9,437,114 B2 | 9/2016 | Ince et al. | |
| 9,443,447 B2 | 9/2016 | Bailiang | |
| 9,449,033 B2 | 9/2016 | Kache et al. | |
| 9,477,224 B2 | 10/2016 | Khan et al. | |
| 9,495,879 B2 | 11/2016 | Depape et al. | |
| 9,501,455 B2 | 11/2016 | Quadracci et al. | |
| 9,708,078 B2 | 7/2017 | Cox et al. | |
| 2004/0139035 A1 | 7/2004 | Wang | |
| 2004/0143488 A1 | 7/2004 | Wang | |
| 2004/0176887 A1 | 9/2004 | Kent et al. | |
| 2005/0090969 A1 | 4/2005 | Siok et al. | |
| 2006/0095156 A1 | 5/2006 | Baiada et al. | |
| 2008/0010107 A1 | 1/2008 | Small et al. | |
| 2008/0046167 A1 | 2/2008 | Small et al. | |
| 2010/0063716 A1 | 3/2010 | Brozat | |
| 2010/0185426 A1 | 7/2010 | Ganesan et al. | |
| 2012/0254084 A1 | 10/2012 | Richter et al. | |
| 2012/0260179 A1 | 10/2012 | Reshadi et al. | |
| 2012/0283963 A1 | 11/2012 | Mitchell et al. | |
| 2013/0013182 A1 | 1/2013 | Bertsimas et al. | |
| 2013/0138584 A1 | 5/2013 | Vana et al. | |
| 2013/0339073 A1 | 12/2013 | Dabbiere | |
| 2014/0052410 A1 | 2/2014 | Tralshawala et al. | |
| 2014/0343833 A1 | 11/2014 | Baiada et al. | |
| 2014/0355869 A1* | 12/2014 | Gershenson | G06T 7/246 382/154 |
| 2014/0368356 A1* | 12/2014 | Samuthirapandian | G08G 5/0004 340/901 |
| 2015/0068289 A1 | 3/2015 | Zhong et al. | |
| 2015/0151834 A1 | 6/2015 | Cox et al. | |
| 2015/0163087 A1 | 6/2015 | Conner et al. | |
| 2015/0330797 A1 | 11/2015 | Shukla | |
| 2015/0348422 A1 | 12/2015 | Agrawal et al. | |
| 2016/0203722 A1 | 7/2016 | Liao et al. | |
| 2016/0232468 A1 | 8/2016 | Meiri et al. | |
| 2016/0314328 A1 | 10/2016 | Hosamane et al. | |
| 2016/0321423 A1 | 11/2016 | Bhatt et al. | |

FOREIGN PATENT DOCUMENTS

| | | |
|---|---|---|
| GB | 2430278 B | 12/2008 |
| WO | WO 02/099769 A1 | 12/2002 |

OTHER PUBLICATIONS

Airport Visualiser, Not only do we know IT, We are also Experts in Aviation, Zebra Enterprise Solutions, http://zebra.basecent.com/admin/resources/images/7/0/1607.pdf, 4 pages.

News Release—Abu Dhabi Airport Services selects the proveo Airport Visualiser, Zebra Enterprise Solutions, http://www.zebra.com/content/dam/zebra/press-releases/en-us/2009/abu-dhabi-en.pdf, May 27, 2009, 3 Pages.

Abu Dhabi Airport Services, Zebra Enterprise Services, http://www.zebra.com/content/dam/zebra/success-stories/en-us/pdfs/abu-dhabi-en-us.pdf, 1 page.

Turn Time Management—Solutions, PASSUR Aerospace, http://www.passur.com/solutions/airlines/turn-time-management/, 3 pages.

Collins, Arinc AirTQM the real-turnaround management system, ARINC Airports, rockwellcollins.com, http://www.rockwellcollins.com/-/media/Files/Unsecure/Services-And-Support/Information-Management/ARINC-Airports-Operations/ARINC-Airports_AirTQM_data-sheet_A4-EMEA.ashx, 2 pages.

\* cited by examiner

SYSTEMS AND METHODS FOR ANALYZING TURNS AT AN AIRPORT

PRIORITY CLAIM

The present application claims the benefit of priority of U.S. Provisional Patent Application No. 62/421,619, entitled "SYSTEMS AND METHODS FOR ANALYZING TURNS AT AN AIRPORT," filed Nov. 14, 2016, which is incorporated herein by reference for all purposes.

FIELD

The present subject matter relates generally to airport operations.

BACKGROUND

An airport can guide aircraft through various phases of a turn. A turn can include a landing of an aircraft, a takeoff of an aircraft, and phases in between (e.g., taxi, loading, etc.) while an aircraft is at an airport. An aircraft turn can require coordination across teams and companies. Many activities can have to occur to make up a path of the turn. Gathering real time status data can require coordination across different companies that can have misaligned priorities.

BRIEF DESCRIPTION

Aspects and advantages of embodiments of the present disclosure will be set forth in part in the following description, or may be learned from the description, or may be learned through practice of the embodiments.

One example aspect of the present disclosure is directed to a method for observing and/or analyzing aircraft turns. The method includes receiving one or more video streams from one or more cameras. The method includes processing the one or more video streams using one or more feature detection techniques to identify one or more objects from the one or more video streams. Processing the one or more video streams includes extracting data associated with the one or more objects. The method includes tracking the one or more objects to determine an event associated with at least one video stream of the one or more video streams based on the one or more objects and the data, wherein the event is associated with at least one phase of an aircraft turn at an airport. The method includes storing the event in a database with an associated parameter. The method includes performing an analysis of the at least one phase of the aircraft turn based, at least in part, on the event and the associated parameter. The method includes providing a signal indicative of an issue with the event based on the analysis.

Another example aspect of the present disclosure is directed to a system for observing and/or analyzing aircraft turns. The system includes one or more cameras. The system includes a database. The system includes one or more processors. The one or more processors are configured to receive one or more video streams from the one or more cameras. The one or more processors are configured to process the one or more video streams using one or more feature detection techniques to identify one or more objects from the one or more video streams. Processing the one or more video streams includes extracting data associated with the one or more objects. The one or more processors are configured to track the one or more objects to determine an event associated with at least one video stream of the one or more video streams based on the one or more objects and the data, wherein the event is associated with at least one phase of an aircraft turn at an airport. The one or more processors are configured to store the event in the database with an associated parameter. The one or more processors are configured to perform an analysis of the at least one phase of the aircraft turn based, at least in part, on the event and the associated parameter. The one or more processors are configured to provide a signal indicative of an issue with the event based on the analysis.

Another example aspect of the present disclosure is directed to an apparatus for observing and/or analyzing aircraft turns. The apparatus includes one or more processors. The one or more processors are configured to receive one or more video streams from one or more cameras. The one or more processors are configured to process the one or more video streams using one or more feature detection techniques to identify one or more objects from the one or more video streams. Processing the one or more video streams includes extracting data associated with the one or more objects. The one or more processors are configured to track the one or more objects to determine an event associated with at least one video stream of the one or more video streams based on the one or more objects and the data, wherein the event is associated with at least one phase of an aircraft turn at an airport. The one or more processors are configured to store the event in a database with an associated parameter. The one or more processors are configured to perform an analysis of the at least one phase of the aircraft turn based, at least in part, on the event and the associated parameter. The one or more processors are configured to provide a signal indicative of an issue with the event based on the analysis.

Another example aspect of the present disclosure is directed to a system for observing and/or analyzing equipment associated with aircraft turns. The system includes one or more databases. The system includes one or more processors. The one or more processors are configured to determine a current operational status of equipment used in at least a portion of an aircraft turn at an airport. The one or more processors are configured to retrieve historical operation times of the equipment from at least one of the one or more databases. The one or more processors are configured to determine an expected operational time for the equipment based, at least in part, on the historical operation times. The one or more processors are configured to determine a real-time estimated time of arrival for the equipment based, at least in part, on the current operational status and the expected operational time. The one or more processors are configured to create a real-time schedule for the equipment based, at least in part, on the real-time estimated time of arrival.

Other example aspects of the present disclosure are directed to systems, methods, airlines, devices, non-transitory computer-readable media for observing and/or analyzing aircraft turns. Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
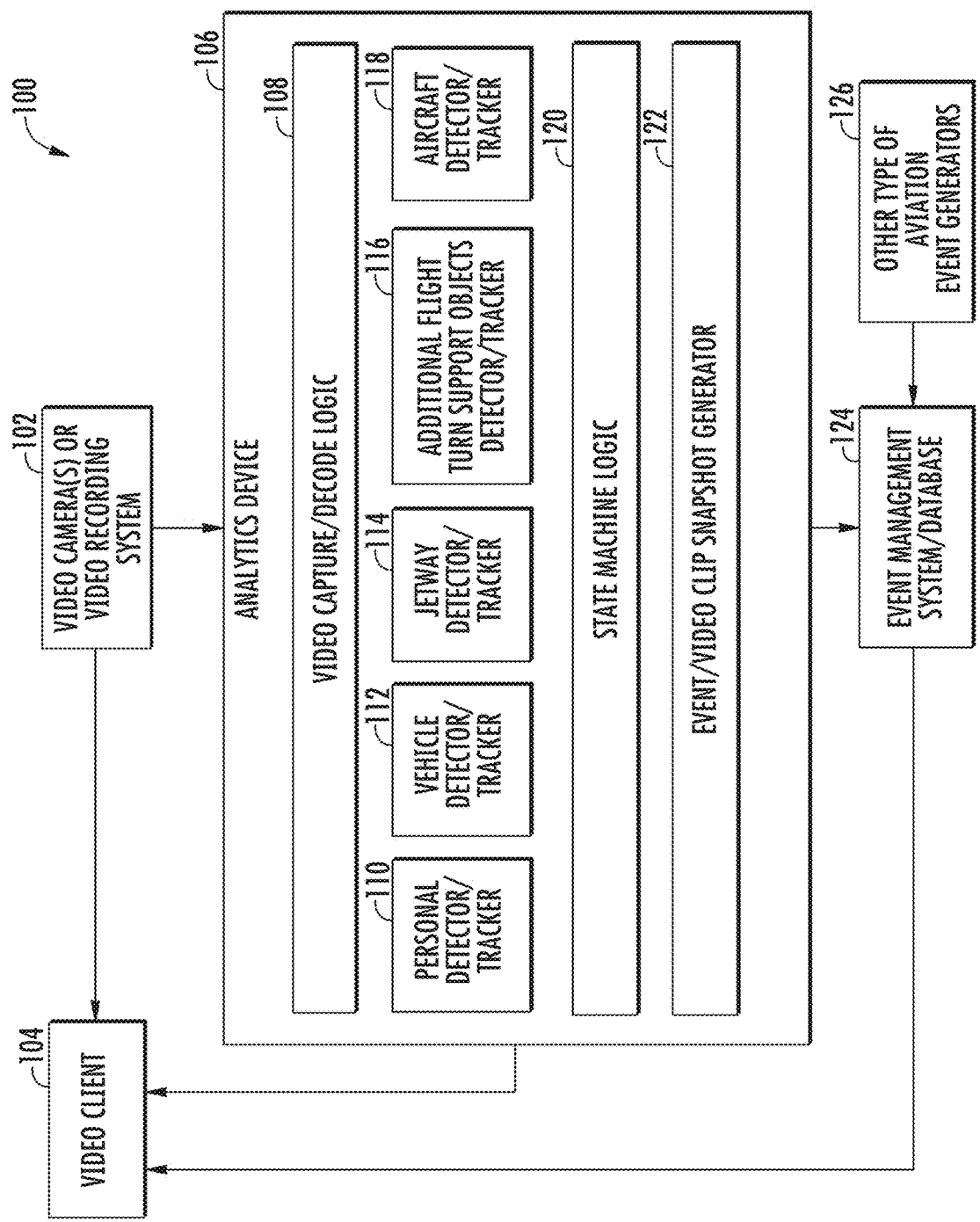
FIG. 1 depicts an example environment in accordance with example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used in the specification and the appended claims, the singular forms "a," "an," and "the" include plural referents unless the context clearly dictates otherwise. The use of the term "about" in conjunction with a numerical value refers to within 25% of the stated amount.

Example aspects of the present disclosure are directed to observing and/or analyzing aircraft turns at an airport using computer vision. A plurality of cameras can record video around a path in which an aircraft takes during a turn. For example, at least one of the plurality of cameras can capture video of an aircraft landing, at least one of the plurality of cameras can capture video of an aircraft parking, at least one of the plurality of cameras can capture video of unloading and/or loading passengers of an aircraft, at least one of the plurality of cameras can capture video of below wing unloading and/or loading of an aircraft, at least one of the plurality of cameras can capture video of an aircraft taxiing, at least one of the plurality of cameras can capture video of an aircraft taking off, etc. The plurality of cameras can capture video of the aircraft and other objects at each phase of an aircraft turn.

The plurality of cameras can provide the captured video to an analytics device. The analytics device can use computer vision to identify one or more objects within still images of the provided video. The analytics device can determine a state of the one or more identified objects. The determined state of the one or more objects can be used to determine an event. The determined event can be a phase of the aircraft turn. The determined event can be associated with a phase of the aircraft turn. The event can include an attached video and/or still image. The event can be time-stamped and stored.

The stored events can be used to determine an expected time at each event and/or phase of the aircraft turn. When an airport and/or airline experiences prolonged delay, the stored events can be examined to determine if a particular event and/or phase is chronically problematic. Corrective action in operations can be taken based on the examination. The stored events can be provided to a video client in real-time. If an event and/or a phase is taking longer than expected, then the stored events can be the video client can be examined in real-time. Corrective action can be taken in real-time based on the examination.

In this way, the systems and methods according to example aspects of the present disclosure can have a technical effect of improving the processing of aircraft turn operations by reducing inefficiencies in aircraft turn operations, and therefore reducing the computational resources required to address inefficiencies in aircraft turn operations. Further, the systems and methods according to example aspects of the present disclosure can have a technical effect of improving the processing of aircraft turn operations by reducing procedural violations in aircraft turn operations, and therefore reducing the computational resources required to address procedural violations in aircraft turn operations.

FIG. 1 depicts an example environment 100 in accordance with example embodiments of the present disclosure. The environment 100 can include one or more video cameras and/or a video recording system 102, a video client 104, an analytics device 106, an event management system and/or event management database 124, and one or more other types of aviation event generators 126. The one or more video cameras and/or the video recording system 102 can capture video and provide one or more video streams to the video client 104 and/or the analytics device 106. The video client 104 can display the one or more video streams provided by the one or more video cameras and/or the video recording system 102. The analytics device 106 can include a video capture/decode logic 108, a personnel detector/tracker 110, a vehicle detector/tracker 112, a jetway detector/tracker 114, an additional flight turn support objects detector/tracker 116, an aircraft detector/tracker 118, state machine logic 120, and an event/video clip snapshot generator 122. The analytics device 106 can receive the one or more video streams provided the one or more video cameras and/or the video recording system 102. The one or more video streams received by the analytics device 106 can be processed by the video capture/decode logic 108. The video capture/decode logic 108 can decode and/or decrypt and/or decompress a video stream that has been encoded and/or encrypted and/or compressed for video transport. The video capture/decode logic 108 can provide the processed video to one or more feature detector/tracker modules, such as, for example, the personnel detector/tracker 110, the vehicle detector/tracker 112, the jetway detector/tracker 114, the additional flight turn support objects detector/tracker 116, and/or the aircraft detector/tracker 118.

The one or more feature detector/tracker modules can include a histogram of oriented gradients (HOG) classifier, a Haar classifier, a deep learning algorithm, the like, and/or any combination of the foregoing. The one or more detector/tracker modules can identify a specific object in a still image of a video stream. In an embodiment, the one or more detector/tracker modules can provide feedback to a controller of the one or more video cameras and/or the video recording system 102 to assist in operation of the one or more video cameras and/or the video recording system 102. For example, if an object being detected and/or tracked by a detector/tracker module is almost out of frame and is moving closer to the edge of the frame in subsequent images, the detector/tracker module can cause a signal to be transmitted to cause a video camera of the one or more video cameras and/or the video recording system 102 to be adjusted. One example detector/tracker module can be the personnel detector/tracker 110. The personnel detector/tracker 110 can detect and/or track ground services crew, such as a crewmember that marshals aircraft, a crewmember that handles baggage, a mechanic, a crewmember that refuels aircraft, etc. One example detector/tracker module can be the vehicle detector/tracker 112. The vehicle detector/tracker 112 can detect and/or track a service vehicle, such as a baggage cart, a fuel truck, etc. One example detector/tracker module can be the jetway detector/tracker 114. The jetway detector/tracker 114 can detect and/or track a jetway. One example detector/tracker module can be the additional flight turn support objects detector/tracker 116. The additional flight turn support objects detector/tracker 116 can detect and/or track any object that supports determining flight turns. One example detector/tracker module can be the aircraft detector/tracker 118. The aircraft detector/tracker 118 can detect and/or track aircraft. The one or more detector/tracker modules can extract information about the detected and/or tracked object from the video stream.

Figure 2:
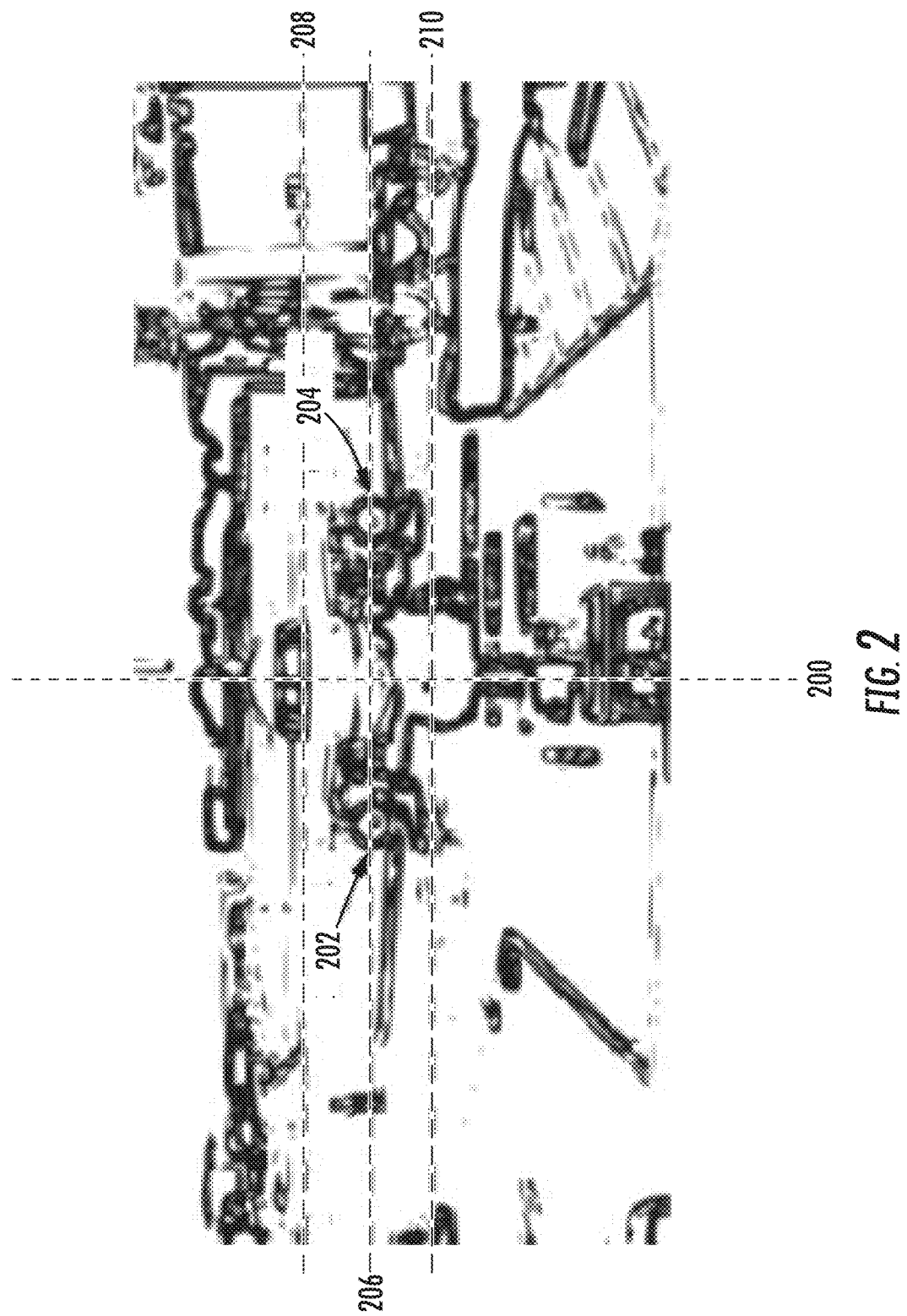
FIG. 2 depicts an example image from a camera according to example embodiments of the present disclosure.
Figure 3:
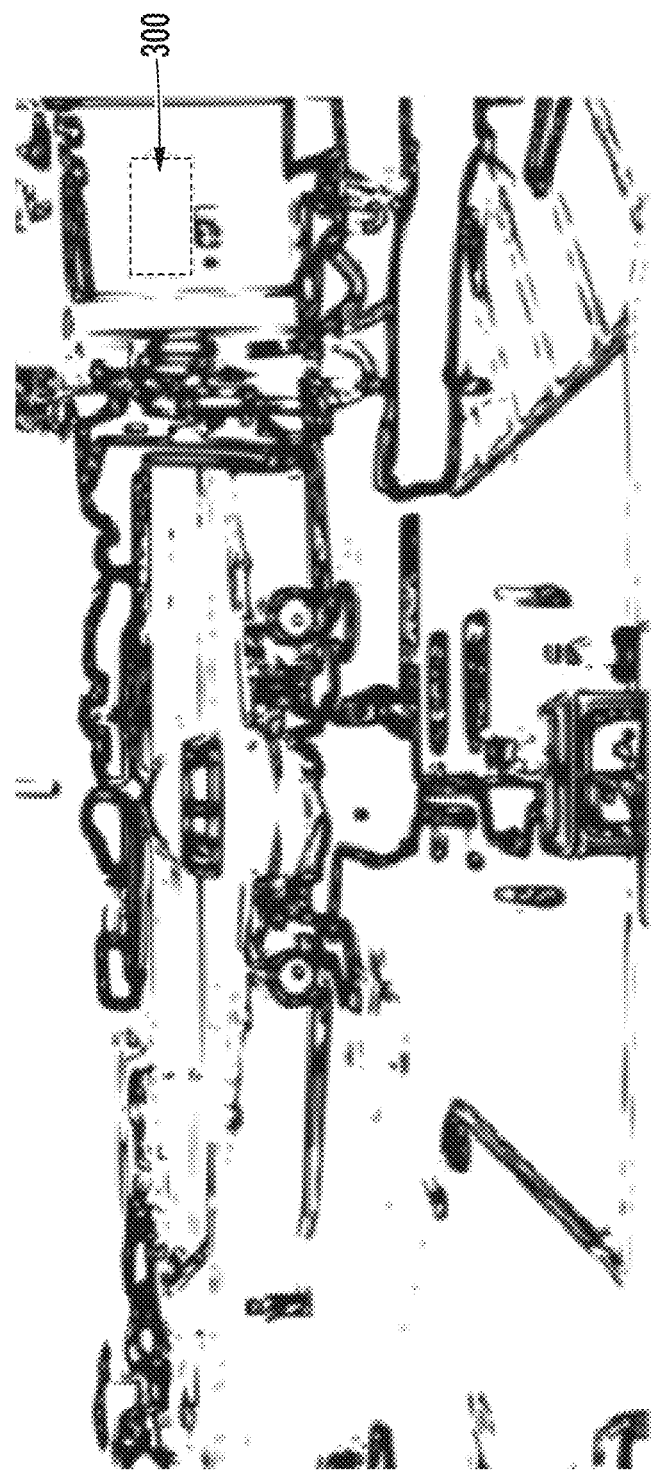
FIG. 3 depicts an example image from a camera according to example embodiments of the present disclosure.

Because the path of aircraft is usually consistent and predictable, the one or more video cameras 102 can be placed in predictable spots. For example, a camera for detecting and/or tracking aircraft can be placed in the center of an aircraft parking spot. See, for example, an image from a camera in FIG. 2. The image can include a center line 200, which can divide an aircraft in a parking spot into a left portion and a right portion. The left portion of the aircraft can include a circle 202 that is representative of an engine, and the right portion of the aircraft can include a circle 204 that is representative of an engine. When the middle of the circles 202 and 204 are aligned with a position line 206 and the circles 202 and 204 exceed a top trigger line 208 and a bottom trigger line 210, the aircraft can be determined to be close enough to the camera to be in a parked position. Because jetways are attached to the port side of the aircraft, a camera for detecting and/or tracking jetways can be placed to the right of the camera for detecting and/or tracking aircraft. See, for example, an image from a camera in FIG. 3. A region of interest 300 where a jetway will deploy to the right of the aircraft can be identified. When the region of interest 300 includes a jetway (for example, when the region of interest includes pixels with a color consistent with the jetway), the jetway can be determined to be attached to the aircraft and the aircraft can be determined to be in a parked position. Because service vehicles engage an aircraft from the starboard side of the aircraft, a camera for tracking vehicles can be placed to the left of the camera for detecting and/or tracking aircraft. As other example, the landing and/or take off path for aircraft can be arranged with one or more cameras for detecting and/or tracking aircraft.

Figure 4:
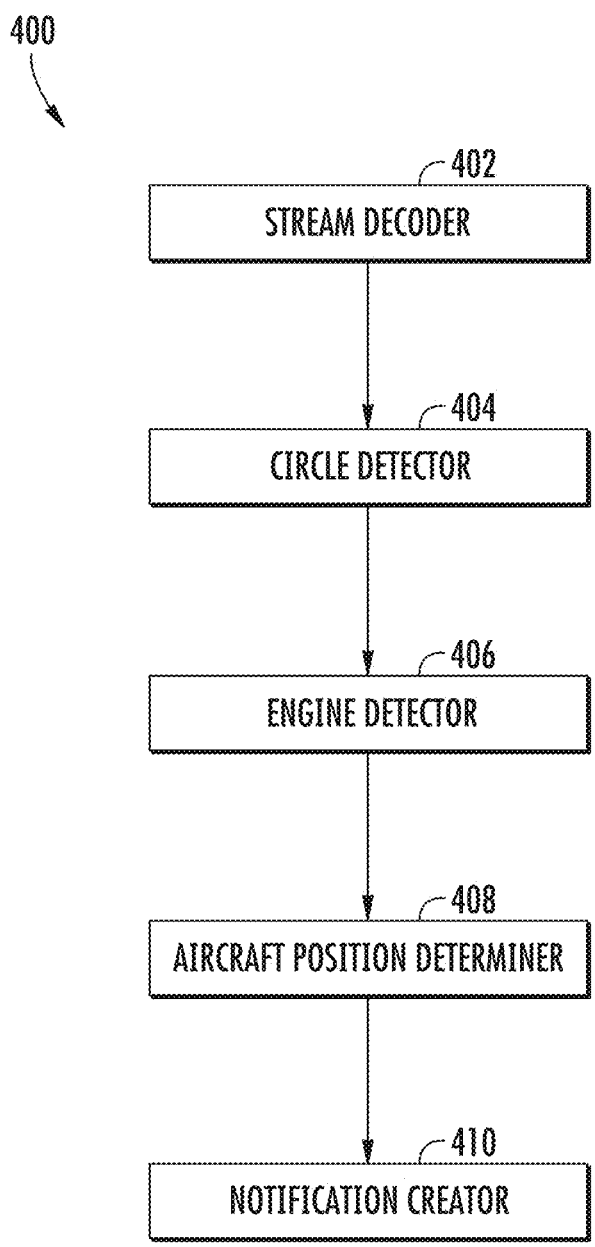
FIG. 4 depicts a workflow diagram of an example plurality of modules according to example embodiments of the present disclosure.
Figure 5:
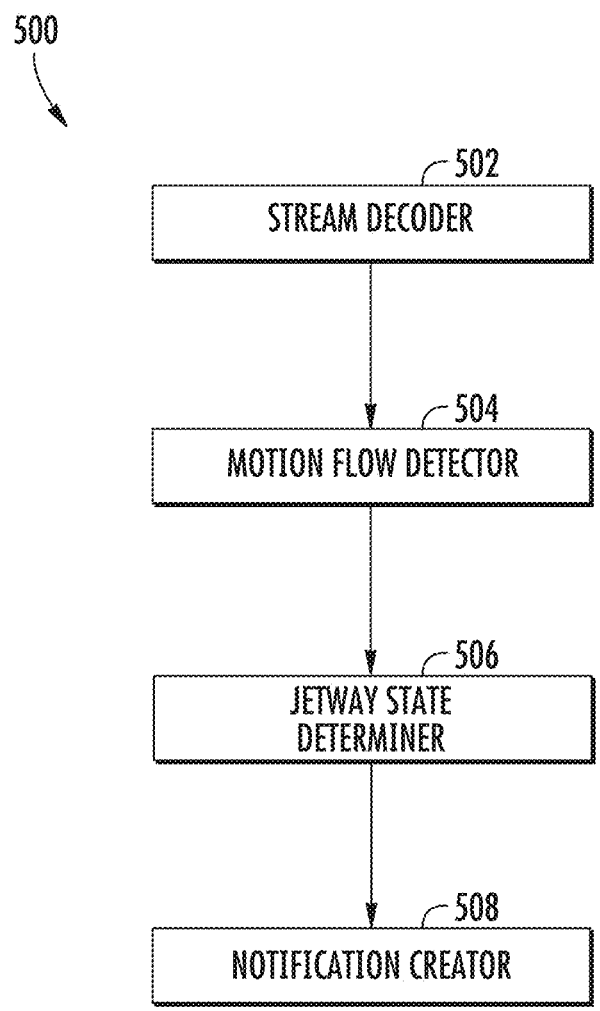
FIG. 5 depicts a workflow diagram of an example plurality of modules according to example embodiments of the present disclosure.

The one or more detector/tracker modules can provide the extracted information about the detected and/or tracked object to the state machine logic 120. The state machine logic 120 can take the extracted information about the detected and/or tracked object and determine a state for the object. For example, a possible state for a detected and/or tracked aircraft can be "parked." As another example, a possible state for a detected and/or tracked jetway can be "extending." There are many other possible states. See, for example, a workflow diagram 400 of FIG. 4. The workflow diagram 400 can be associated with the image of FIG. 2. At (402), a stream decoder can decode (e.g., make the stream interpretable for downstream modules, etc.) the video stream. Downstream modules can include a circle detector, an engine detector, an aircraft position determiner, and a notification creator. At (404), the circle detector can identify circles within the decoded video stream. The identified circles can be isolated from the decoded video stream for further analysis. At (406), the engine detector can detect which of the identified circles are circles representative of an engine using one or more circle factors. The circle factors can include radius, origin, horizontal distance from other circles, vertical distance from other circles, total distance from other circles, symmetry around a center, the like and/or any combination of the foregoing. At (408), the aircraft position determiner can determine a position of the aircraft based on the position of the detected one or more engines. At (410), the notification creator can create a notification when a position of the aircraft reaches or exceeds trigger parameters. For example, the trigger lines 208 and 210 in FIG. 2 can be trigger parameters, and when circles 202 and 204 representative of engines associated with an aircraft touch both trigger lines 208 and 210, a notification can be created and sent (e.g., transmitted, transferred, etc.) to a user. See, for example, a workflow diagram 500 of FIG. 5. The workflow diagram 500 can be associated with the image of FIG. 3. At (502), a stream decoder can decode (e.g., make the stream interpretable for downstream modules, etc.) the video stream. Downstream modules can include a motion flow detector, a jetway position determiner, and a notification creator. At (504), the motion flow detector can detect a magnitude of motion and/or an angle of motion within the region of interest 300 in the image in FIG. 3. At (506), the jetway state determiner can use the magnitude and/or angle of motion detected to determine a magnitude and/or angle of motion associated with the jetway. In an aspect, the jetway can always be in the region of interest 300. At (508), the notification creator can create a notification when a state of the jetway reaches or exceeds magnitude thresholds and/or angle thresholds. For example, if jetway appears to exceed the magnitude thresholds and/or angle thresholds in the region of interest 300, then an assumption can be made that the jetway is attached to the aircraft and a notification can be created and sent (e.g., transmitted, transferred, etc.) to a user.

The state machine logic 120 can provide the determined state of the object to the event/video clip snapshot generator 122. The event/video clip snapshot generator 122 can create an event based on the provided state of the object. For example, an event can be created based on an aircraft parking. The event can have an attached video clip. For example, a video of an aircraft parking can be attached to an event create for the aircraft parking. Another example event can be created when a vehicle arrives to an area where an aircraft parks. Another example event can be created when the vehicle engages with the parked aircraft. There are many other possible events. The events can be associated with a timestamp. The events can be provided to the video client 104. Text portions of the event can be used as an overlay over associated portions of the one or more video streams or the attached video clip.

The events can be provided to the event management system/database 124. The event management system/database 124 can be in a cloud-computing environment. The event management system/database 124 can correlate received events. The event management system/database 124 can examine correlated events for a variety of reasons, such as, for example, identifying inefficiencies or procedure violations. For example, a first event can indicate that an aircraft has been parked for a first threshold time. A second event can indicate that no catering has arrived at the aircraft yet. A notification can be raised that the aircraft will likely be late in departing if the catering does not show up within a second threshold time. As another example, a first event can indicate that an aircraft is refueling at a certain time. A second event can indicate that a vehicle is directly behind the aircraft at the certain time. A safety procedure can mandate that the vehicle should not be directly behind the aircraft when the aircraft is refueling. A notification can be raised that the safety procedure has been violated. Identifying inefficiencies and/or procedure violations can be done by examining archived events, to identify chronically problematic situations. Additionally, archived events can be examined and/or aggregated to determine an expected time for an event. Identifying inefficiencies and/or procedure violations can be done by examining real-time events, to identify a current situation. Identifying inefficiencies will be explained in more detail in reference to FIG. 7.

The event management system/database 124 can receive additional events from the other type of aviation event generators 126. The other type of aviation event generators 126 can include, for example, an Aircraft Communications Addressing and Reporting System (ACARS). The other type of aviation event generators 126 can include monitoring sensors and communicating the results of the monitored sensors. Communication of the monitored sensors can happen during an occurrence of an action, such as an aircraft door opening. The event management system/database 124 can correlate the events received from the analytics device 104 and the events received from the other type of aviation event generators 126.

The event management system/database 124 can provide the correlated events to the video client 104. Text portions of correlated events can be used as an overlay over associated portions of the one or more video streams or the attached video clips. In one embodiment, video clips associated with correlated events can be displayed in a time synced manner on one screen or multiple screens. In another embodiment, video clips associated with correlated events can be displayed sequentially.

Figure 6:
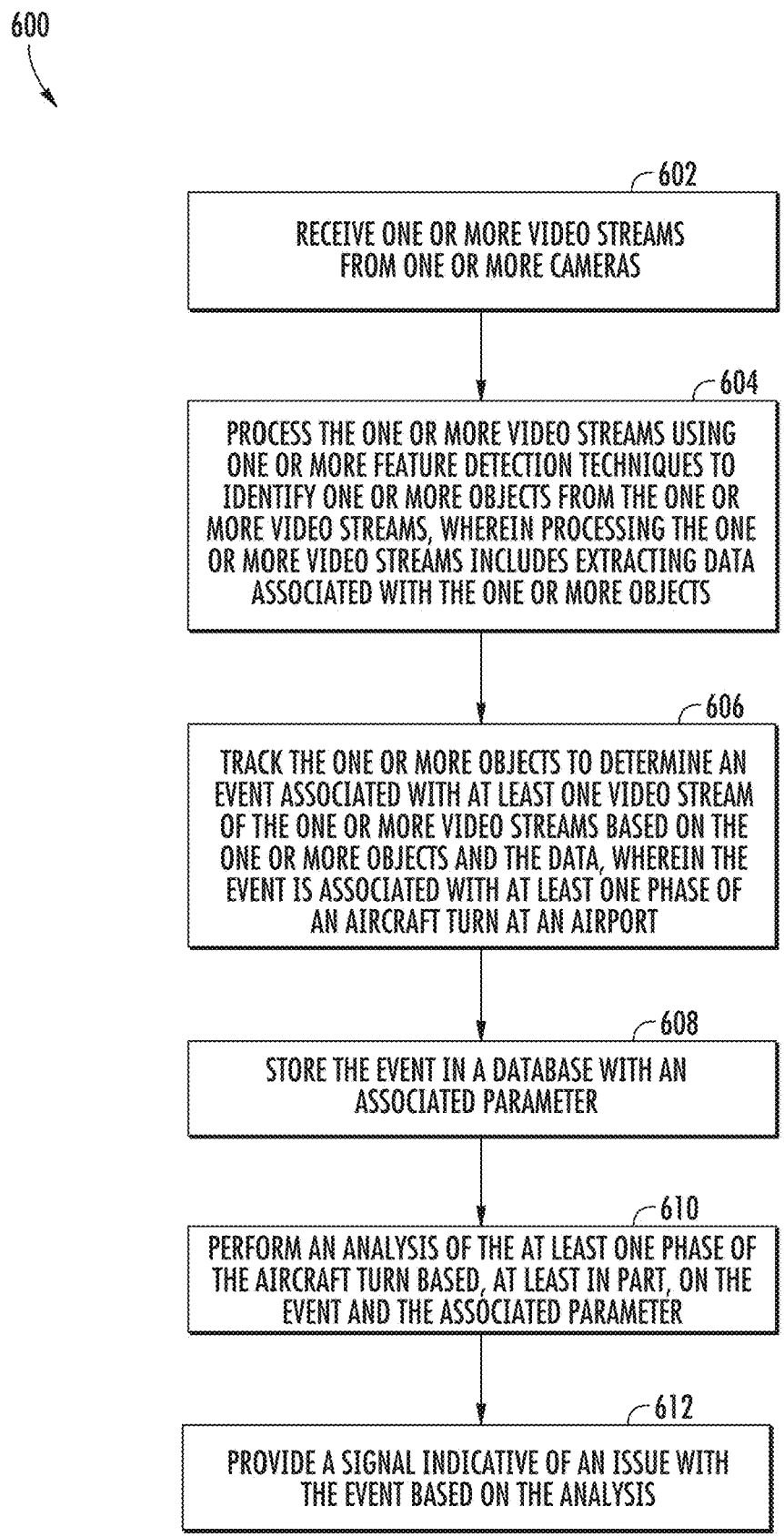
FIG. 6 depicts a flow diagram of an example method according to example embodiments of the present disclosure.

FIG. 6 depicts a flow diagram of an example method 600 for observing and/or analyzing aircraft turns. The method of FIG. 6 can be implemented using, for instance, the analytics device 106 of FIG. 1 and/or the control system 800 of FIG. 8. FIG. 6 depicts steps performed in a particular order for purposes of illustration and discussion. Those of ordinary skill in the art, using the disclosures provided herein, will understand that various steps of any of the methods disclosed herein can be adapted, rearranged, or modified in various ways without deviating from the scope of the present disclosure.

At (602), one or more video streams can be received from one or more cameras. For example, the analytics device 106 can receive one or more video streams from one or more cameras. As another example, the control system 800 can receive one or more video streams from one or more cameras. At (604), the one or more video streams can be processed using one or more feature detection techniques to identify one or more objects from the one or more video streams. For example, the analytics device 106 can process the one or more video streams using one or more feature detection techniques to identify one or more objects from the one or more video streams. As another example, the control system 800 can process the one or more video streams using one or more feature detection techniques to identify one or more objects from the one or more video streams. Processing the one or more video streams can include extracting data associated with the one or more objects. The one or more feature detection techniques can include a histogram of oriented gradients (HOG) classifier, a Haar classifier, a deep learning algorithm, the like, and/or any combination of the foregoing. The one or more identified objects can include personnel, vehicles, jetways, aircraft, additional flight turn support objects, the like, and/or any combination of the foregoing. In an aspect, processing the one or more video streams can include detecting one or more circles within the one or more video streams. In a further aspect, processing the one or more video streams can include detecting one or more engines based on the one or more circles. Extracting the data associated with the one or more objects can include extracting size and/or position information associated with the one or more objects, such as one or more of the one or more circles. In another aspect, processing the one or more video streams can include detecting a motion flow in a region of interest within the one or more video streams. In a further aspect, the region of interest can include a jetway. Extracting the data associated with the one or more objects can include extracting a movement angle and a movement magnitude from the one or more objects, such as from the region of interest and/or an object associated with the region of interest.

At (606), the one or more objects can be tracked to determine an event associated with at least one video stream of the one or more video streams based on the one or more objects and the data. For example, the analytics device 106 can track the one or more objects to determine an event associated with at least one video stream of the one or more video streams based on the one or more objects and the data. As another example, the control system 800 can track the one or more objects to determine an event associated with at least one video stream of the one or more video streams based on the one or more objects and the data. An event can be a phase in an aircraft turn at an airport. An event can be associated with a phase in an aircraft turn at an airport. An event can be associated with a task associated with a phase in an aircraft turn. In an aspect, tracking the one or more objects to determine an event can include determining a position of an aircraft based on the one or more circles. In an aspect, tracking the one or more objects to determine an event can include making a determination that the aircraft is parked when one or more of the one or more circles exceed one or more trigger parameters. In another aspect, tracking the one or more objects to determine an event can include determining a state of a jetway based on the motion flow in the region of interest. In another aspect, tracking the one or more objects to determine an event can include making a determination that the aircraft is parked when the movement angle and the movement magnitude of the region of interest are consistent with a deployed state of the jetway.

At (608), the event can be stored in a database with an associated parameter. For example, the analytics device 106 can store the event in a database with an associated parameter. As another example, the control system 800 can store the event in a database with an associated parameter. The parameter can be and/or include a timestamp. The parameter can be and/or include a video clip. The parameter can be and/or include a still image. The parameter can be additional information to describe at least one of the one or more objects. As another example, a parameter can be an expected range of positions for people, equipment, and/or other objects associated with the at least one phase of the turn. As another example, a parameter can include an expected order in which two or more tasks associated with phases of an aircraft turn should occur. The database can be queried by a video client and/or another computing device. The database can be in a cloud-computing environment.

At (610), an analysis of the at least one phase of the aircraft turn can be performed based, at least in part, on the event and the associated parameter. For example, the analytics device 106 can perform an analysis of the at least one phase of the aircraft turn based, at least in part, on the event and the associated parameter. As another example, the control system 800 can perform an analysis of the at least one phase of the aircraft turn based, at least in part, on the event and the associated parameter. The analysis can include comparing a time derived from at least the time stamp with an expected time. For example, the time derived from at least the time stamp can be a duration that the at least one phase of the aircraft turn or an associated task took to complete. The expected time can be an expected duration that the at least one phase of the aircraft turn or an associated task should take to complete. The analysis can indicate that the at least one phase of the aircraft turn or task takes a threshold amount of time longer than the expected time. As another example, the analysis can include comparing an observed range of positions for a person, equipment, and/or other objects associated with the at least one phase of the turn with the expected range of positions. In an aspect, the analysis can indicate that a person wandered into an area where they should not be. In an aspect, the analysis can indicate that an equipment was attached or was attempted to be attached to a wrong side of an aircraft. As another example, the analysis can include comparing an observed task order with the expected task order. The analysis can indicate that a task was performed out of order, relative to another task. In an embodiment, a set of problematic events can be analyzed to determine a common thread. For example, if a set of twenty events include food loading which take twenty minute or more when the expected food loading time is ten minutes, the set of twenty event can be examined to see what attributes (e.g., gate number, employees, airline, flight crew, etc.) are shared by multiple events. In this way, a cause of problematic events can be inferred.

At (612), a signal indicative of an issue with the event can be provided based on the analysis. For example, the analytics device 106 can provide a signal indicative of an issue with the event based on the analysis. As another example, the control system 800 can provide a signal indicative of an issue with the event based on the analysis. In an aspect, the signal can indicate that a phase and/or associated task is taking a threshold amount longer than it should. In an aspect, the signal can indicate that a person, equipment, and/or object is in an area where the person, equipment, and/or object should not be. In an aspect, the signal can indicate that a phase and/or task was performed out of order relative to another phase and/or task. In an aspect, the signal can indicate an attribute common to multiple problematic events.

Optionally, a determination can be made that the aircraft is parked when the one or more engines exceed one or more trigger parameters. For example, the analytics device 106 can make a determination that the aircraft is parked when the one or more engines exceed one or more trigger parameters. As another example, the control system 800 can make a determination that the aircraft is parked when the one or more engines exceed one or more trigger parameters. Optionally, when the determination is made that the aircraft is parked, a notification that the aircraft is parked can be created. For example the analytics device 106 can create a notification that the aircraft is parked when the determination that the aircraft is parked is made. As another example, the control system 800 can create a notification that the aircraft is parked when the determination that the aircraft is parked is made.

Optionally, a determination can be made that the aircraft is parked based on the state of the jetway. For example, the analytics device 106 can make a determination that the aircraft is parked based on the state of the jetway. As another example, the control system 800 can make a determination that the aircraft is parked based on the state of the jetway. Optionally, when the determination is made that the aircraft is parked, a notification that the aircraft is parked can be created. For example the analytics device 106 can create a notification that the aircraft is parked when the determination that the aircraft is parked is made. As another example, the control system 800 can create a notification that the aircraft is parked when the determination that the aircraft is parked is made.

Optionally, one or more historical operation times can be retrieved. For example, the analytics device 106 can retrieve historical operation times from the event management system/database 124. As another example, the control system 800 can retrieve historical operation times from the event management system/database 124. The historical operational times can be associated with a time that an aircraft is in a turn or a phase in a turn. The historical operational times can be associated with equipment used during an aircraft turn or a phase in an aircraft turn. Optionally, an expected operation time can be determined based on the one or more historical operation times. For example, the analytics device 106 can determine an expected operation time based on the one or more historical operation times. As another example, the control system 800 can determine an expected operation time based on the one or more historical operation times. Determining an expected operation time can include using a machine learning algorithm to determine the expected operation time.

Optionally, one or more historical gate-to-gate times can be retrieved. For example, the analytics device 106 can retrieve historical gate-to-gate times from the event management system/database 124. As another example, the control system 800 can retrieve historical gate-to-gate times from the event management system/database 124. The historical gate-to-gate times can be associated with a time that an aircraft is in a turn or a phase in a turn. The historical gate-to-gate times can be associated with equipment used during an aircraft turn or a phase in an aircraft turn. Optionally, an expected gate-to-gate time can be determined based on the one or more historical gate-to-gate times. For example, the analytics device 106 can determine an expected gate-to-gate time based on the one or more historical gate-to-gate times. As another example, the control system 800 can determine an expected gate-to-gate time based on the one or more historical gate-to-gate times. Determining an expected gate-to-gate time can include using a machine learning algorithm to determine the expected gate-to-gate time.

Optionally, a current operation status can be determined, based, at least in part, on the event. For example, the analytics device 106 can determine a current operational status based, at least in part, on the event. As another example, the control system 800 can determine a current operational status based, at least in part, on the event. Optionally, a real-time position of equipment can be determined, based, at least in part, on the event. For example, the analytics device 106 can determine a real-time position of equipment based, at least in part, on the event. As another example, the control system 800 can determine a real-time position of equipment based, at least in part, on the event.

Optionally, a real-time estimated time of arrival can be determined for the equipment based, at least in part, on one or more of the expected operation time, the expected gate-to-gate time, the current operational status, or the real-time position of equipment. For example, the analytics device 106 can determine a real-time estimated time of arrival for the equipment based, at least in part, on one or more of the expected operation time, the expected gate-to-gate time, the current operational status, or the real-time position of equipment. As another example, the control system 800 can determine a real-time estimated time of arrival for the equipment based, at least in part, on one or more of the expected operation time, the expected gate-to-gate time, the current operational status, or the real-time position of equipment.

Optionally, a gate schedule can be received. For example, the analytics device 106 can receive a gate schedule. As another example, the control system 800 can receive a gate schedule. Optionally, one or more operational constraints can be received. For example, the analytics device 106 can receive one or more operational constraints. As another example, the control system 800 can receive one or more operational constraints. Optionally, a real-time schedule can be created for the equipment based, at least in part, on the real-time estimated time of arrival, the gate schedule, and the one or more operational constraints. For example, the analytics device 106 can create a real-time schedule for the equipment based, at least in part, on the real-time estimated time of arrival, the gate schedule, and the one or more operational constraints. As another example, the control system 800 can create a real-time schedule for the equipment based, at least in part, on the real-time estimated time of arrival, the gate schedule, and the one or more operational constraints.

Figure 7:
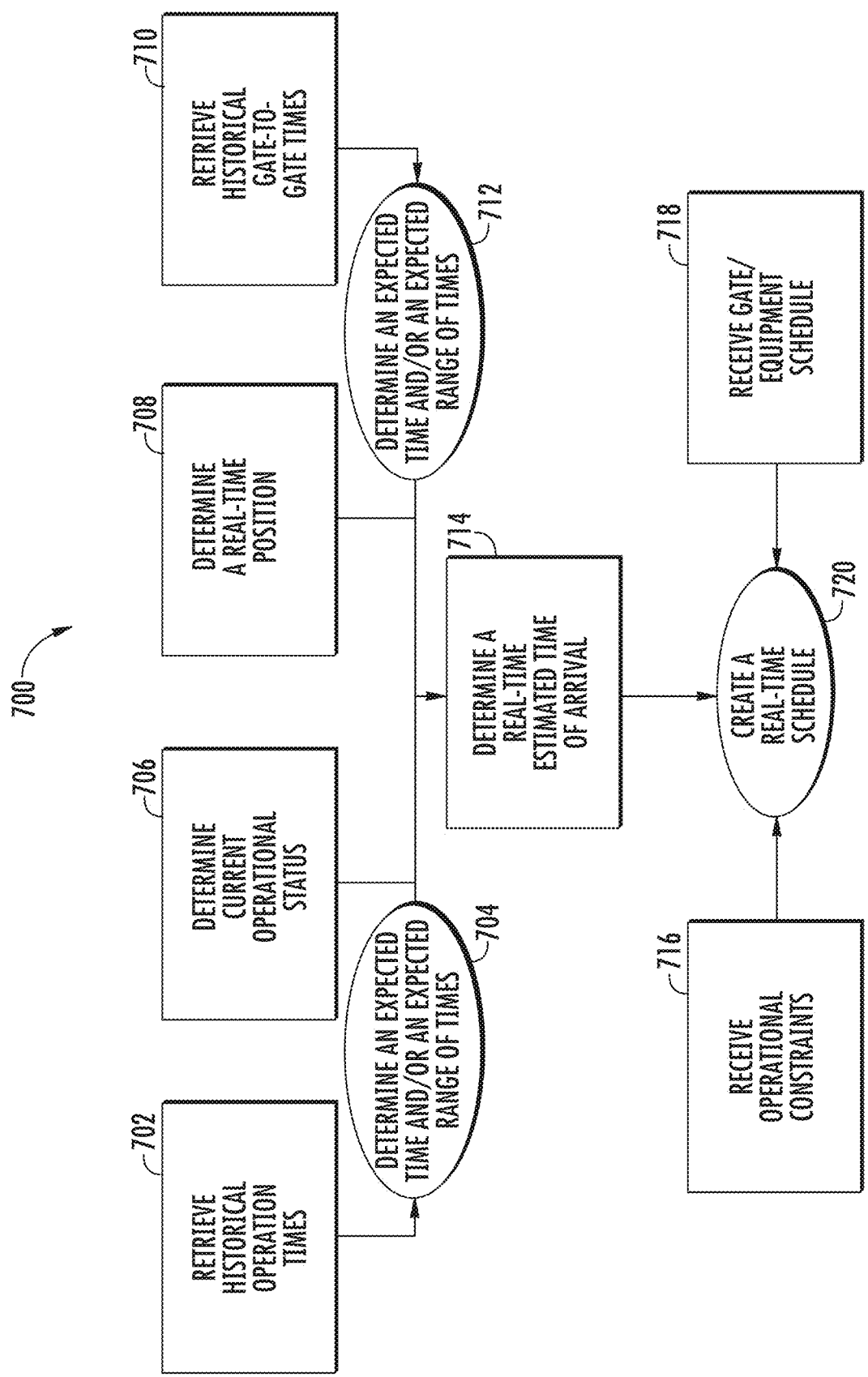
FIG. 7 depicts a flow diagram of an example method according to example embodiments of the present disclosure.

FIG. 7 depicts a flow diagram of an example method (700) for observing and/or analyzing aircraft turns. The method of FIG. 7 can be implemented using, for instance, the analytics device 106 of FIG. 1 and/or the control system 800 of FIG. 8. FIG. 7 depicts steps performed in a particular order for purposes of illustration and discussion. Those of ordinary skill in the art, using the disclosures provided herein, will understand that various steps of any of the methods disclosed herein can be adapted, rearranged, or modified in various ways without deviating from the scope of the present disclosure.

At (702), historical operation times can be retrieved from one or more databases. For example, the analytics device 106 can retrieve historical operation times from the event management system/database 124. As another example, the control system 800 can retrieve historical operation times from the event management system/database 124. The historical operational times can be associated with a time that an aircraft is in a turn or a phase in a turn. The historical operational times can be associated with equipment used during an aircraft turn or a phase in an aircraft turn. At (704), a machine learning algorithm can be used to determine an expected time and/or an expected range of times based on the historical operation times. For example, the analytics device 106 can use a machine learning algorithm to determine an expected time and/or an expected range of times based on the historical operation times from the event management system/database 124. As another example, the control system 800 can use a machine learning algorithm to determine an expected time and/or an expected range of times based on the historical operation times from the event management system/database 124. The expected time and/or the expected range of times can be associated with an aircraft turn or a phase in an aircraft turn. The expected time and/or the expected range of times can be associated with equipment used during an aircraft turn or a phase in an aircraft turn. At least one of the one or more databases can be in a cloud-computing environment.

At (706), a current operational status can be determined. For example, the analytics device 106 can determine a current operational status. As another example, the control system 800 can determine a current operational status. The current operational status can be associated with an aircraft turn or a phase in an aircraft turn. The current operational status can be associated with equipment used during an aircraft turn or a phase in an aircraft turn. One or more video streams can be received from video cameras or video recording system 102. The current operational status can be determined by processing at least one of the one or more video streams. At (708), a real-time position can be determined. For example, the analytics device 106 can determine a real-time position. As another example, the control system 800 can determine a real-time position. The real-time position can be associated with an aircraft during an aircraft turn or a phase in an aircraft turn. The real-time position can be associated with equipment associated with an aircraft turn or a phase in an aircraft turn. The current operational status can be associated with equipment used during an aircraft turn or a phase in an aircraft turn. One or more video streams can be received from video cameras or video recording system 102. The real-time position can be determined by processing at least one of the one or more video streams.

At (710), historical gate-to-gate times can be retrieved from one or more databases. For example, the analytics device 106 can retrieve historical gate-to-gate times from the event management system/database 124. As another example, the control system 800 can retrieve historical gate-to-gate times from the event management system/database 124. The historical gate-to-gate times can be associated with a time that an aircraft is in a turn or a phase in a turn. The historical gate-to-gate times can be associated with equipment used during an aircraft turn or a phase in an aircraft turn. At (712), a machine learning algorithm can be used to determine an expected time and/or an expected range of times based on the historical gate-to-gate times. For example, the analytics device 106 can use a machine learning algorithm to determine an expected time and/or an expected range of times based on the historical gate-to-gate times from the event management system/database 124. As another example, the control system 800 can use a machine learning algorithm to determine an expected time and/or an expected range of times based on the historical gate-to-gate times from the event management system/database 124. The expected time and/or the expected range of times can be associated with an aircraft turn or a phase in an aircraft turn. The expected time and/or the expected range of times can be associated with equipment used during an aircraft turn or a phase in an aircraft turn.

At (714), a real-time estimated time of arrival can be determined. For example, the analytics device 106 can determine a real-time estimated time of arrival. As another example, the control system 800 can determine a real-time estimated time of arrival. The real-time estimated time of arrival can be based, at least in part, on one or more of the expected time and/or the expected range of times based on the historical operation times, the current operational status, the real-time position, or the expected time and/or the expected range of times based on the historical gate-to-gate times. The estimated time of arrival can be associated with a time that an aircraft is in a turn or a phase in a turn. The estimated time of arrival can be associated with equipment used during an aircraft turn or a phase in an aircraft turn.

At (716), one or more operational constraints can be received. For example, the analytics device 106 can receive one or more operational constraints. As another example, the control system 800 can receive one or more operational constraints. The one or more operational constraints can include, for example, unavailable equipment, available equipment, aircraft turn paths foreclosed in light of current weather conditions, possible aircraft turn paths in light of current weather conditions, aircraft turn paths foreclosed in light of other aircraft, possible aircraft turn paths in light of other aircraft, etc.

At (718), a gate schedule and/or an equipment schedule can be received. For example, the analytics device 106 can receive a gate schedule and/or an equipment schedule. As another example, the control system 800 can receive a gate schedule and/or an equipment schedule. At (720), a real-time schedule can be created. For example, the analytics device 106 can create a real-time schedule. As another example, the control system 800 can create a real-time schedule. The real-time schedule can be based, at least in part, on one or more of the estimated time of arrival, the one or more operational constraints, or the gate schedule and/or the equipment schedule. The real-time schedule can be associated with an aircraft in a turn or a phase in a turn. The real-time schedule can be associated with equipment used during an aircraft turn or a phase in an aircraft turn.

Figure 8:
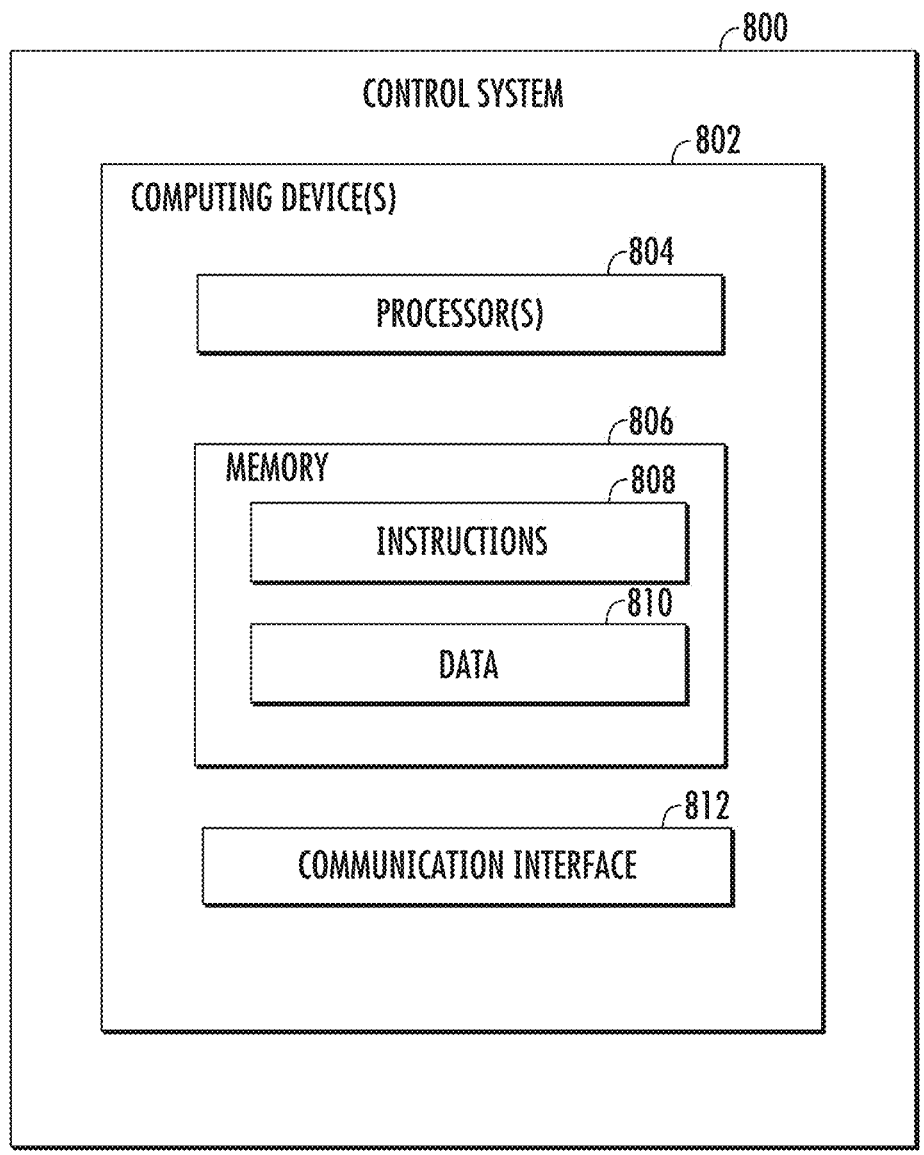
FIG. 8 depicts a computing system for implementing one or more aspects according to example embodiments of the present disclosure.

FIG. 8 depicts a block diagram of an example computing system that can be used to implement the control system 800 or other systems according to example embodiments of the present disclosure. As shown, the control system 800 can include one or more computing device(s) 802. The one or more computing device(s) 802 can include one or more processor(s) 804 and one or more memory device(s) 806. The one or more processor(s) 804 can include any suitable processing device, such as a microprocessor, microcontroller, integrated circuit, logic device, or other suitable processing device. The one or more memory device(s) 806 can include one or more computer-readable media, including, but not limited to, non-transitory computer-readable media, RAM, ROM, hard drives, flash drives, or other memory devices.

The one or more memory device(s) 806 can store information accessible by the one or more processor(s) 804, including computer-readable instructions 808 that can be executed by the one or more processor(s) 804. The instructions 808 can be any set of instructions that when executed by the one or more processor(s) 804, cause the one or more processor(s) 804 to perform operations. The instructions 808 can be software written in any suitable programming language or can be implemented in hardware. In some embodiments, the instructions 808 can be executed by the one or more processor(s) 804 to cause the one or more processor(s) 804 to perform operations, such as the operations for observing and/or analyzing aircraft turns, as described with reference to FIG. 6.

The memory device(s) 806 can further store data 810 that can be accessed by the processors 804. For example, the data 810 can include video streams, event data, aircraft turn data, as described herein. The data 810 can include one or more table(s), function(s), algorithm(s), model(s), equation(s), etc. for observing and/or analyzing aircraft turns according to example embodiments of the present disclosure.

The one or more computing device(s) 802 can also include a communication interface 812 used to communicate, for example, with the other components of the system and/or other computing devices. The communication interface 812 can include any suitable components for interfacing with one or more network(s), including for example, transmitters, receivers, ports, controllers, antennas, or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for analyzing aircraft turns comprising:
one or more cameras;
a database; and
one or more processors configured to:
  receive one or more video streams from the one or more cameras;
  process the one or more video streams using one or more feature detection techniques to identify one or more objects from the one or more video streams, wherein processing the one or more video streams comprises extracting data associated with the one or more objects, and wherein processing the one or more video streams using the one or more feature detection techniques to identify the one or more objects from the one or more video streams comprises detecting one or more circles within the one or more video streams; and detecting one or more engines based on the one or more circles;
  track the one or more objects to determine an event associated with at least one video stream of the one or more video streams based on the one or more objects and the data, wherein the event is associated with at least one phase of an aircraft turn at an airport;

store the event in the database with an associated parameter;

perform an analysis of the at least one phase of the aircraft turn based, at least in part, on the event and the associated parameter; and provide a signal indicative of an issue with the event based on the analysis.

2. The system of claim 1, wherein the parameter is a timestamp, wherein the analysis comprises comparing a time derived from at least the time stamp with an expected time, and wherein the analysis indicates that the at least one phase of the aircraft turn takes a threshold amount of time longer than the expected time.

3. The system of claim 1, wherein extracting the data associated with the one or more objects further comprises extracting size and position information associated one or more of the one or more circle.

4. The system of claim 3, wherein tracking the one or more objects to determine the event further comprises making a determination that the aircraft is parked when one or more of the one or more circles exceed one or more trigger parameters.

5. The system of claim 4, wherein the one or more processors are further configured to create a notification that the aircraft is parked when the determination is made that the aircraft is parked.

6. The system of claim 1, wherein the database is in a cloud-computing environment.

7. A method for analyzing aircraft turns comprising:
receiving, at one or more computing devices, one or more video streams from one or more cameras;
processing, at the one or more computing devices, the one or more video streams using one or more feature detection techniques to identify one or more objects from the one or more video streams, wherein processing the one or more video streams comprises extracting data associated with the one or more objects;
tracking, at the one or more computing devices, the one or more objects to determine an event associated with at least one video stream of the one or more video streams based on the one or more objects and the data, wherein the event is associated with at least one phase of an aircraft turn at an airport;
storing, at the one or more computing devices, the event in a database with an associated parameter, wherein the parameter is a timestamp;
performing, at the one or more computing devices, an analysis of the at least one phase of the aircraft turn based, at least in part, on the event and the associated parameter, and wherein the analysis comprises comparing a time derived from at least the time stamp with an expected time; and
providing, at the one or more computing devices, a signal indicative of an issue with the event based on the analysis, and wherein the signal indicates that the at least one phase of the aircraft turn takes a threshold amount of time longer than the expected time.

8. A system for analyzing aircraft turns comprising:
one or more cameras;
a database; and
one or more processors configured to:
receive one or more video streams from the one or more cameras;
process the one or more video streams using one or more feature detection techniques to identify one or more objects from the one or more video streams, wherein processing the one or more video streams comprises extracting data associated with the one or more objects, wherein processing the one or more video streams using the one or more feature detection techniques to identify the one or more objects from the one or more video streams further comprises detecting a motion flow in a region of interest within the one or more video streams;
track the one or more objects to determine an event associated with at least one video stream of the one or more video streams based on the one or more objects and the data, wherein the event is associated with at least one phase of an aircraft turn at an airport;
store the event in the database with an associated parameter;
perform an analysis of the at least one phase of the aircraft turn based, at least in part, on the event and the associated parameter; and
provide a signal indicative of an issue with the event based on the analysis.

9. The system of claim 8, wherein extracting the data associated with the one or more objects further comprises extracting a movement angle and a movement magnitude associated with the region of interest.

10. The system of claim 9, wherein the region of interest comprises a jetway.

11. The system of claim 10, wherein tracking the one or more objects to determine the event further comprises making a determination that an aircraft is parked when the movement angle and the movement magnitude of the region of interest are consistent with a deployed state of the jetway.

12. The system of claim 11, wherein the one or more processors are further configured to create a notification that the aircraft is parked when the determination is made that the aircraft is parked.

13. The system of claim 8, wherein the parameter is a timestamp, wherein the analysis comprises comparing a time derived from at least the time stamp with an expected time, and wherein the analysis indicates that the at least one phase of the aircraft turn takes a threshold amount of time longer than the expected time.

14. The system of claim 8, wherein the parameter is an expected range of positions for people or equipment associated with the at least one phase of the aircraft turn.

15. The system of claim 14, wherein the analysis comprises comparing an observed range of positions for the people or the equipment associated with the at least one phase of the aircraft turn with the expected range of positions.

16. The system of claim 8, wherein the parameter is an expected order in which two or more tasks associated with phases of the aircraft turn should occur.

17. The system of claim 16, wherein the analysis comprises comparing an observed task order with the expected task order, and wherein the analysis indicates that a task was performed out of order relative to another task.

18. The system of claim 8, wherein the signal indicative of the issue with the event indicates that a vehicle is directly behind the aircraft during refueling of an aircraft.

19. The method of claim 7, wherein processing, at the one or more computing devices, the one or more video streams using the one or more feature detection techniques to identify the one or more objects from the one or more video streams comprises:
detecting one or more circles within the one or more video streams; and detecting one or more engines based on the one or more circles.

20. The method of claim 7, wherein processing, at the one or more computing devices, the one or more video streams using the one or more feature detection techniques to identify the one or more objects from the one or more video streams comprises:
    detecting a motion flow in a region of interest within the one or more video streams, and wherein the region of interest comprises a jetway.

* * * * *